United States Patent
Conradsen et al.

(10) Patent No.: US 9,878,309 B2
(45) Date of Patent: Jan. 30, 2018

(54) CATALYST FOR AMMONIA OXIDATION

(71) Applicant: DANMARKS TEKNISKE UNIVERSITET, Lyngby (DK)

(72) Inventors: Christian Nagstrup Conradsen, Copenhagen (DK); Sine Ellemann Olesen, Dyssegård (DK); Debasish Chakraborty, Copenhagen (DK); Ib Chorkendorff, Birkerød (DK)

(73) Assignee: Danmarks Tekniske Universitet, Lyngby (DK)

( * ) Notice: Subject to any disclaimer, the term of this patent is extended or adjusted under 35 U.S.C. 154(b) by 0 days.

(21) Appl. No.: 15/100,245

(22) PCT Filed: Oct. 30, 2014

(86) PCT No.: PCT/EP2014/073293
§ 371 (c)(1),
(2) Date: May 27, 2016

(87) PCT Pub. No.: WO2015/082141
PCT Pub. Date: Jun. 11, 2015

(65) Prior Publication Data
US 2017/0001177 A1 Jan. 5, 2017

(30) Foreign Application Priority Data

Dec. 6, 2013 (EP) ..................................... 13196039

(51) Int. Cl.
B01D 53/86 (2006.01)
B01D 53/94 (2006.01)
(Continued)

(52) U.S. Cl.
CPC ...... *B01J 23/8926* (2013.01); *B01D 53/8634* (2013.01); *B01D 53/9436* (2013.01);
(Continued)

(58) Field of Classification Search
CPC . B01J 21/04; B01J 21/06; B01J 23/462; B01J 23/72; B01J 23/8926; B01J 35/0006; B01D 53/8634; B01D 53/9436
See application file for complete search history.

(56) References Cited

U.S. PATENT DOCUMENTS 3,947,554 A 3/1976 Senes et al.
5,139,756 A 8/1992 Shikada et al.
(Continued)

FOREIGN PATENT DOCUMENTS

EP 0 275 681 A1 7/1988
EP 0 706 816 A1 4/1996
(Continued)

OTHER PUBLICATIONS

Brandenberger, Sandro et al., "The State of the Art in Selective Catalytic Reduction of NOx by Ammonia Using Metal-Exchanged Zeolite Catalysts" Catalysis Reviews, 2008, pp. 492-531, vol. 50.
(Continued)

*Primary Examiner* — Cam N. Nguyen
(74) *Attorney, Agent, or Firm* — Knobbe Martens Olson & Bear LLP

(57) ABSTRACT

The present invention relates to a bimetallic catalyst for ammonia oxidation, a method for producing a bimetallic catalyst for ammonia oxidation and a method for tuning the catalytic activity of a transition metal. By depositing an overlayer of less catalytic active metal onto a more catalytic active metal, the total catalytic activity is enhanced.

12 Claims, 3 Drawing Sheets

(51) Int. Cl.

| | | |
|---|---|---|
| *B01J 21/04* | (2006.01) | |
| *B01J 21/06* | (2006.01) | |
| *B01J 23/46* | (2006.01) | |
| *B01J 23/72* | (2006.01) | |
| *B01J 23/89* | (2006.01) | |
| *B01J 35/00* | (2006.01) | |
| *B01J 37/02* | (2006.01) | |

(52) U.S. Cl.
CPC ....... *B01J 35/0006* (2013.01); *B01J 37/0244* (2013.01); *B01D 2255/1026* (2013.01); *B01D 2255/20761* (2013.01); *B01D 2255/9022* (2013.01); *B01D 2257/406* (2013.01)

(56) References Cited

U.S. PATENT DOCUMENTS

| | | | |
|---|---|---|---|
| 5,587,134 A | 12/1996 | Dannevang | |
| 5,690,900 A | 11/1997 | Smojver | |
| 6,777,370 B2* | 8/2004 | Chen | B01D 53/945 502/241 |
| 7,410,626 B2 | 8/2008 | Tran et al. | |
| 7,618,600 B1 | 11/2009 | Luo et al. | |
| 7,722,845 B2 | 5/2010 | Caudle et al. | |
| 8,101,146 B2* | 1/2012 | Fedeyko | B01D 53/9436 422/169 |
| 8,605,280 B2* | 12/2013 | Heck | B01J 13/22 356/301 |
| 8,932,673 B2* | 1/2015 | Patil | B01J 37/34 423/448 |
| 9,044,744 B2* | 6/2015 | Casci | B01D 53/9418 |
| 9,242,239 B2* | 1/2016 | Fedeyko | B01J 37/0244 |
| 9,511,991 B2* | 12/2016 | Baillin | B81B 7/0038 |
| 9,597,671 B2* | 3/2017 | Casci | B01D 53/9418 |
| 2003/0021745 A1* | 1/2003 | Chen | B01D 53/945 423/239.1 |
| 2003/0050196 A1* | 3/2003 | Hirano | A61L 9/00 507/238 |
| 2003/0202927 A1 | 10/2003 | Minkara et al. | |
| 2004/0198595 A1* | 10/2004 | Chen | B01D 53/945 502/328 |
| 2007/0004587 A1* | 1/2007 | Chebiam | C23C 18/1893 502/167 |
| 2009/0008258 A1* | 1/2009 | Rei | B01D 53/944 205/177 |
| 2009/0087367 A1 | 4/2009 | Liu et al. | |
| 2010/0177462 A1* | 7/2010 | Adzic | B82Y 30/00 361/502 |
| 2011/0182791 A1 | 7/2011 | Fedeyko et al. | |
| 2012/0309610 A1* | 12/2012 | Harold | B01J 37/0244 502/74 |
| 2013/0039828 A1 | 2/2013 | Coupland | |
| 2016/0101413 A1* | 4/2016 | Fedeyko | B01D 53/9436 422/171 |

FOREIGN PATENT DOCUMENTS

| | | |
|---|---|---|
| WO | WO 98/57887 A1 | 12/1998 |
| WO | WO 2009/045833 A1 | 4/2009 |
| WO | WO 2009/091951 A1 | 7/2009 |
| WO | WO 2011/107279 A1 | 9/2011 |
| WO | WO 2012/170421 A1 | 12/2012 |

OTHER PUBLICATIONS

Colombo, Massimo et al., "A simplified approach to modeling of dual-layer ammonia slip catalysts" Chemical Engineering Science, 2012, pp. 75-83, vol. 75.

Cui, Xiangzhi et al., "Selective catalytic oxidation of ammonia to nitrogen over mesoporous CuO/RuO$_2$ synthesized by co-nanocasting-replication method" Journal of Catalysis, 2010, pp. 310-317, vol. 270.

Darvell, L.I. et al., "An investigation of alumina-supported catalysts for the selective catalytic oxidation of ammonia in biomass gasification" Catalysis Today, 2003, pp. 681-692, vol. 81.

Gang, Lu et al., "Alumina-Supported Cu—Ag Catalysts for Ammonia Oxidation to Nitrogen at Low Temperature" Journal of Catalysis, 2002, pp. 60-70, vol. 206.

Houston, J.E. et al., "Monolayer and Multilayer Growth of Cu on the Ru(0001) Surface" Surface Science, 1986, pp. 427-436, vol. 167.

Jansen, Susan et al., "Acid Catalysts Based on Cu/Ru Alumina: Conversion of Butyraldehyde to Dibutyl Ether" Journal of Catalysis, 1996, pp. 262-270, vol. 163.

Jones, J.M. et al., "The selective oxidation of ammonia over alumina supported catalysts—experiments and modelling" Applied Catalysis B: Environmental, 2005, pp. 139-146, vol. 60.

Koschel, H. et al., "Correlation between chemical properties and electronic structure of pseudomorphic Cu monolayers on Ni(1 1 1) and Ru(0 0 0 1)" Surface Science, 2001, pp. 113-125, vol. 477.

Lin, Shawn D. et al., "Ammonia oxidation over Au/MO$_x$/γ-Al$_2$O$_3$—activity, selectivity and FTIR measurements" Catalysis Today, 2004, pp. 3-14, vol. 90.

Long, R.Q. et al., "Selective Catalytic Oxidation of Ammonia to Nitrogen over Fe$_2$O$_3$—TiO$_2$ Prepared with a Sol-Gel Method" Journal of Catalysis, 2002, pp. 158-165, vol. 207.

Olofsson, Göran et al., "Atransient response study of the selective catalytic oxidation of ammonia to nitrogen on Pt/CuO/Al$_2$O$_3$" Chemical Engineering Science, 2004, pp. 4113-4123, vol. 59.

Scheuer, A. et al., "NH$_3$-Slip Catalysts: Experiments Versus Mechanistic Modelling" Top Catal, 2009, pp. 1847-1851, vol. 52.

Scheuer, A. et al., "Dual layer automotive ammonia oxidation catalysts: Experiments and computer Simulation" Applied Catalysis B: Environmental, 2012, pp. 445-455, vol. 111-112.

International Search Report for PCT/EP2014/073293 dated Jan. 26, 2015.

* cited by examiner

CATALYST FOR AMMONIA OXIDATION

CROSS REFERENCE TO RELATED APPLICATIONS

This application is a U.S. National Phase Application of PCT International Application Number PCT/EP2014/073293, filed on Oct. 30, 2014, designating the United States of America and published in the English language, which is an International Application of and claims the benefit of priority to European Patent Application No. 13196039.5, filed on Dec. 6, 2013. The disclosures of the above-referenced applications are hereby expressly incorporated by reference in their entireties.

FIELD OF THE INVENTION

The present invention relates to a bimetallic catalyst for ammonia oxidation. The present invention relates also to a method for producing a bimetallic catalyst for ammonia oxidation and to a method for tuning the catalytic reactivity of a metal.

BACKGROUND OF THE INVENTION

The ammonia oxidation reaction has many important applications. One important application is in ammonia cracking systems where the combustion of ammonia is used to provide heat for the ammonia cracking reaction to generate hydrogen from ammonia, e.g. as shown in WO 2011/107279.

Another application with a much larger demand than the first one is for the removal of slip ammonia after ammonia assisted selective catalytic reduction (SCR) of automotive diesel engine exhaust. Diesel engine generates nitrogen oxides (NOx) which is seriously harmful for the human health and in order to follow the regulations, the exhaust of the diesel engines is treated for NOx removal. One of the widely used treatments is indeed SCR, where ammonia is added to the exhaust. In order to bring the NOx concentration level to the expected level, the ammonia added is typically more than what is required by the reaction. This results in ammonia slip that needs to be removed by combustion. A third important application is the removal of ammonia from biogas generation plant, which, if not removed, generates NOx after combustion.

For all these applications low temperature light off of ammonia oxidation is required. Currently the catalysts employed in these processes for ammonia oxidation are based on scarce and expensive metals, such as Pt and Pd, e.g. as described in U.S. Pat. No. 5,587,134 and U.S. Pat. No. 7,722,845.

Hence, an improved catalyst would be advantageous, and in particular a more efficient, having higher catalytic activity and/or less expensive catalyst would be advantageous.

OBJECT OF THE INVENTION

It is an object of the invention to provide a catalyst for ammonia oxidation having enhanced catalytic activity.

It may be seen as an object of the invention to provide a method for tuning the catalytic reactivity of a metal layer.

It is a further object of the present invention to provide an alternative to the prior art.

In particular, it may be seen as an object of the present invention to provide a catalyst that solves the above mentioned problems of the prior art with a novel catalytic material for ammonia oxidation based on less expensive and more abundant metals.

SUMMARY OF THE INVENTION

Thus, the above described object and several other objects are intended to be obtained in a first aspect of the invention by providing a bimetallic catalyst for ammonia oxidation, the bimetallic catalyst comprising: a first metal layer; a second metal layer; and a substrate; wherein the first metal layer is located onto said second metal layer and wherein the second metal layer is located onto said substrate.

Bimetallic is defined as comprising at least two metal or metallic layers. A metal or metallic layer comprises or consists of a metal element in its pure metal form, i.e. in their oxidation state zero, i.e. as a free uncombined element. Metal elements or metallic elements may be alkali metals, alkaline earth metals, transition metals, post-transition metals, lanthanides or actinides.

Preferably a metal element according to the invention is a transition metal. In some embodiments, the first metal layer comprises or consists of a not noble metal element and the second metal layer comprises or consists of a noble metal element.

In some other embodiments the first and second metal layers comprise or consist of noble metal elements.

In some other embodiments the first and second metal layers comprise or consist of non-platinum metals elements.

The first metal layer is located onto the second metal layer, thus the first metal layer is the outer surface of the catalyst that will be in contact with the flow of ammonia under operation.

The catalyst under operation will be in contact with the flow of ammonia and oxygen.

In some embodiments the first metal layer is a layer of a metal that is less catalytically active towards ammonia oxidation than a metal of the second metal layer.

The inventions stems from the surprising observation that the catalytic activity towards ammonia oxidation of a catalyst comprising two metal layers in which the top layer is less catalytically active than the bottom layer, is higher than the one of catalysts having a single metal layer.

Surprisingly, a less catalytically active metal layer deposited onto a more catalytically active metal layer increases the overall catalytic activity of the catalyst compared to the single layer catalysts.

Thus, in some embodiments the second metal layer is a layer of a metal that is more catalytically active towards ammonia oxidation than a metal of the first metal layer.

Generally a catalyst having a metal layer of a noble metal, such as Ru, shows a higher catalytic activity towards ammonia oxidation, than a catalyst having a single layer of a less noble metal, such as Cu.

However surprisingly, a catalyst having a layer of Cu onto a layer of Ru supported on a substrate has a catalytic activity towards ammonia oxidation that is higher than catalyst having either a single layer of Cu or a single layer of Ru supported on the same substrate.

Thus, in some embodiments the first metal layer is a Cu layer.

In some embodiments the Cu layer consists only of metallic Cu, in its oxidation state zero, i.e. as a free uncombined element.

In some other embodiments the first metal layer or top metal layer may consist of Fe or Co or Ag.

In some other embodiments the second metal layer is a Ru layer.

In some embodiments the Ru layer consists only of metallic Ru, in its oxidation state zero, i.e. as a free uncombined element.

In some other embodiments the second or bottom metal layer may consist of Rh, Pt or Pd.

Thus, examples of bimetallic layers could be Cu/Ru, Cu/Rh, Fe/Ru, Co/Ru, Ag/Pt, or Ag/Pd. In some embodiments the first layer segregates on top of the second layer and the d-band of the first or top layer is changed, such as shifted upwards or downwards compared to Fermi level when the first layer is deposited on top of the second metal layer.

In particular a bimetallic catalyst having a desired thickness of the first metal layer onto the second metal layer has shown enhanced catalytic activities.

In some embodiments the first metal layer has a thickness between 0.1 and 10 monolayers, such as between 0.5 and 5 monolayers.

In some embodiments the first metal layer has a thickness between 0.1 and 3 monolayers.

In some embodiments the first metal layer has a thickness of 0.8 monolayers. In some other embodiments the first metal layer has a thickness of 1 monolayer. Tests of the catalyst produced shows that the Cu overlayer affects the catalyst activity of the Ru layer and that surprisingly an optimal thickness can be found, e.g. of 0.8 monolayers of Cu onto Ru, producing a catalyst having a catalytic activity towards ammonia that is doubled when compared to the single layer catalysts.

The thickness is herein reported in monolayers. Thickness may be also referred to as reported in Angstrom, i.e. $10^{-10}$ m, where a 1 monolayer corresponds to 2.56 Å of Cu layer thickness. The thickness reported is assuming that the deposition of the first metal layer onto the second metal layer is in a two dimensional (2D) form, i.e. as continuous monolayers. However, the deposition may be discontinuous, i.e. islands may be formed. Thus, the thickness referred to in unit length, i.e. Å or monolayers should be considered as an average thickness assuming that the deposition occurred in a 2D form.

In some embodiments the weight ratio between the second metal layer and the first metal layer is in the area between 1:0.05 and 1:0.5. For example, increased activity has been shown in bimetallic catalyst with a Ru to Cu weight ratio of 1:0.3.

In some embodiments the metal of the first metal layer is segregated onto the second metal layer.

The first metal layer segregates to the surface of the second metal layer forming a stable surface overlayer of the first metal layer onto the second metal layer.

In some other embodiments the metal of the first metal layer does not form an alloy with the metal of the second metal layer. The metal of the first metal layer does not form an alloy with the metal, also referred to as host, of the second metal layer.

The first and second metal layer are not mixable as thermodynamically the two metals are immiscible because of positive heat of alloy formation. This lead to a clear structure characterized by a layer of a second metal located onto a substrate and an overlayer or a first metal onto the second metal layer.

Surprisingly a segregated overlayer of a metal that is less catalytically active towards ammonia oxidation than the metal of the underlayer produces an increase of the overall catalytic activity of the catalyst compared to the single metal layer catalyst.

In general the substrate has the function of supporting the catalyst.

In some embodiments the substrate is a metal oxide.

For example, the metal oxide of the substrate may be titania, alumina, silica or ceria.

In other embodiments, the substrate is zeolite or combination of zeolite materials. For example the zeolites of the substrate may be beta zeolite or Y Zeolite.

The invention is particularly, but not exclusively, advantageous for obtaining a catalyst having a higher catalytic activity and that is less expensive than current catalysts.

In a second aspect of the invention a method for producing a bimetallic catalyst according the first aspect of the invention is provided; the method comprising: depositing the second metal layer onto said substrate; and subsequently depositing the first metal layer onto the second metal layer.

The invention relates also to a method of producing the catalyst by preparing a support, e.g. an alumina ($Al_2O_3$) support, loaded with the second metal layer, e.g. ruthenium and subsequently depositing the first metal layer, e.g. copper.

The process may include hydrogen gas reduction after each deposition.

The order in which the depositions steps are carried out determines the activity of the catalyst.

Indeed, catalysts produced by co-evaporation of the first and the second metal layer are not as active as the overlayered structures produced by firstly depositing the second metal layer and subsequently depositing the first metal layer. The co-evaporation of the first and the second metal layer is simultaneous. However, catalysts produced by co-deposition still perform better than catalyst having a single layer of less active metal, e.g. copper, but worse than catalyst having a single layer of a pure metal having high activity, e.g. ruthenium. Furthermore, adding the less active metal to the bulk does not improve the overall catalytic performance when compared to the catalyst produced according to the second aspect; i.e. by sequential deposition.

In a third aspect of the invention a method for tuning the catalytic activity of a metal layer by changing the position of the d-band centre of the metal is provided.

This aspect of the invention is particularly, but not exclusively, advantageous in that the method according to an aspect of the present invention may tune the catalytic activity of a less expensive metal layer by using it as an overlayer, thus enhancing the catalytic activity and lowering the final costs due to the price of the material used.

In some embodiments according to the third aspect of the invention the method comprises depositing the metal layer as overlayer onto a transition metal layer.

In some embodiments the depositing comprises depositing a desired thickness of the overlayer. For example the desired thickness may be between 0.1 and 3 monolayers. In some other embodiments the desired thickness is 1 monolayer. In some other embodiments the desired thickness is 0.8 monolayers.

In some embodiments according to the third aspect of the invention weight ratio between the transition metal layer and the metal overlayer is in the area between 1:0.1 and 1:0.5.

In a further aspect of the invention a method for tuning the catalytic activity of a bimetallic catalysis according to the first aspect of the invention, comprising depositing the first metal layer onto the second metal layer, thereby changing the position of the d-band centre of the metal of the first metal layer is provided. The first, second and third and other aspects and/or embodiments of the present invention may each be combined with any of the other aspects and/or embodiments. These and other aspects and/or embodiments of the invention will be apparent from and elucidated with reference to the embodiments described hereinafter.

BRIEF DESCRIPTION OF THE FIGURES

The catalyst and the methods according to the invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1:
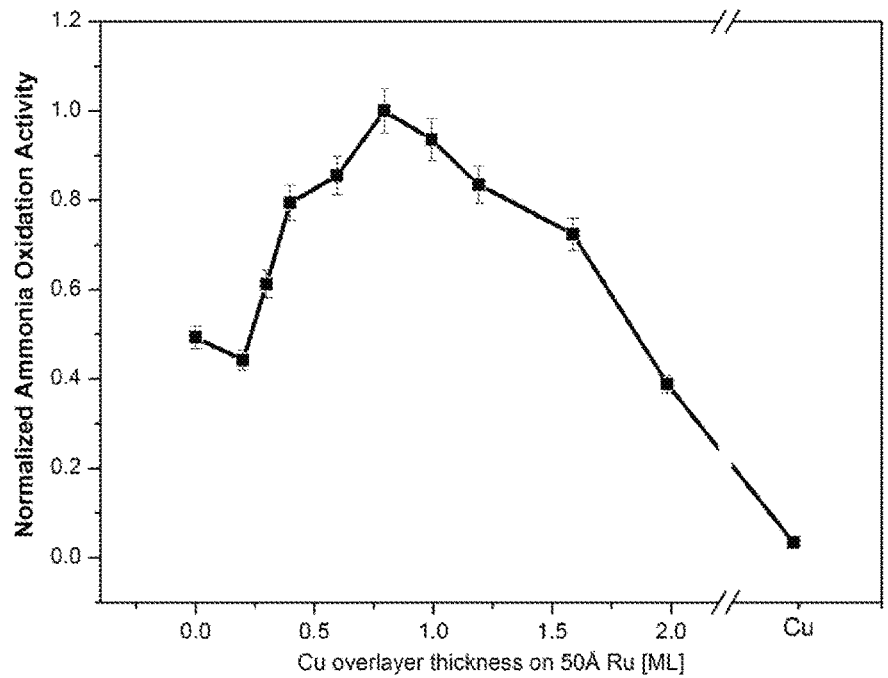
FIG. 1 shows the activity of overlayer structure of Cu/Ru for varying thickness of copper on a 50 Å layer of ruthenium according to some embodiments of the invention.

A number of Cu/Ru catalytic systems have been produced and tested.

In some examples, the material, i.e. Cu/Ru, has been synthesized in surface science experimental setup with a controlled atmosphere. The setup conducting the experiments in Ultra High Vacuum (UHV) has a base pressure $1 \times 10^{-10}$ Torr. It combines an E-beam evaporator and surface scientific methods such as X-Ray Photoelectron Spectroscopy (XPS) and Ion Scattering Spectroscopy (ISS) for characterization with a High Pressure Cell (HPC) allowing catalytic testing up to 1 bar of reactant gas.

A number of Cu/Ru systems are evaporated on the $TiO_2$ substrate for varying overlayer thickness of copper on a 50 Å Ru thin film. After deposition the catalytic Cu/Ru spots are characterized by XPS and transferred to the HPC where the spots are exposed to reactant gas and the temperature is ramped up and down in steps. In order to test the catalytic activity, of the $TiO_2$ samples are moved into a HPC where the composition and flow of the reactant gases can be controlled by flow controllers. The outlet of the HPC is connected to a roughing line through a pressure controller which regulates the pressure to 1 bar. For the high pressure ammonia oxidation reaction N6 gases of 5.000 ppm $NH_3$ diluted in argon and 5.000 ppm $O_2$ diluted in argon are used. The gas composition the HPC is 1:1. The ammonia oxidation in the HPC is tracked with a Balzers quadrupole mass spectrometer. The pressure is reduced a factor $10^{-6}$ Torr with a glass capillary inserted in a nozzle device to avoid spillover effects from neighbouring metal spots. During the experiment, a number of masses connected to the ammonia oxidation are measured to make it possible to distinguish ammonia from water and to investigate the formation of NOx.

In the UHV setup the catalytic spots are evaporated on a $10 \times 10$ mm$^2$ $TiO_2$ (110) rutile single crystal suspended on tungsten-filaments. The temperature is measured with a thermocouple glued on the side of the $TiO_2$ substrate. The evaporator uses an E-beam to do Physical Vapour Deposition (PVD) on one or more metals at the same time. A circular mask ensures well defined circular spots of 1 mm diameter size. The rate, ratio and thickness of the deposited catalytic spots are determined using a Quartz Crystal Microbalance (QCM). The films produced have a thickness of 50 Å.

After testing, the catalytic spots are further characterized by XPS and ISS to investigate changes during the testing phase. The activity of the overlayer structure is presented in FIG. 1. The signal measured in the Quadrupole Mass Spectrometer (QMS) is normalized with the argon signal, as the leak through the glass capillary is temperature dependent.

The activity is measured as the increase in the 28 AMU signal, excluding the CO contribution. Equally the signal for 32 AMU decreases as a sign of the oxygen being consumed in the ammonia oxidation process. The ammonia level is measured on 17, 16 and 15 AMU and it drops as the temperature increases. The model system is 100% selective towards clean combustion as NOx is not observed for any of the catalytic Cu/Ru spots on $TiO_2$.

The Cu/Ru system exhibits higher activity towards ammonia combustion than both pure ruthenium and copper. A volcano curve is observed of the thickness of the copper overlayer on ruthenium with an optimal thickness of 0.8 monolayer (ML). Adding a copper overlayer in the order of a monolayer to the ruthenium thin film improves the catalytic activity and the Cu/Ru system compared to the Ru catalyst almost by 100% better. Pure ruthenium exhibits high activity but is improved in both the model system and for the high surface area catalyst by having a copper overlayer. The copper overlayer thickness in FIG. 1 is varied from 0-2 ML, i.e. from 0-5 Å with the system performing better for a copper overlayer in the range of 0.25-2 ML, i.e. 0.6-5 Å. The catalytic performance of Cu/Ru system is very sensitive to the thickness of the Cu overlayer. The deposition of the Cu overlayer onto Ru leads to an enhanced catalytic activity.

Figure 2:
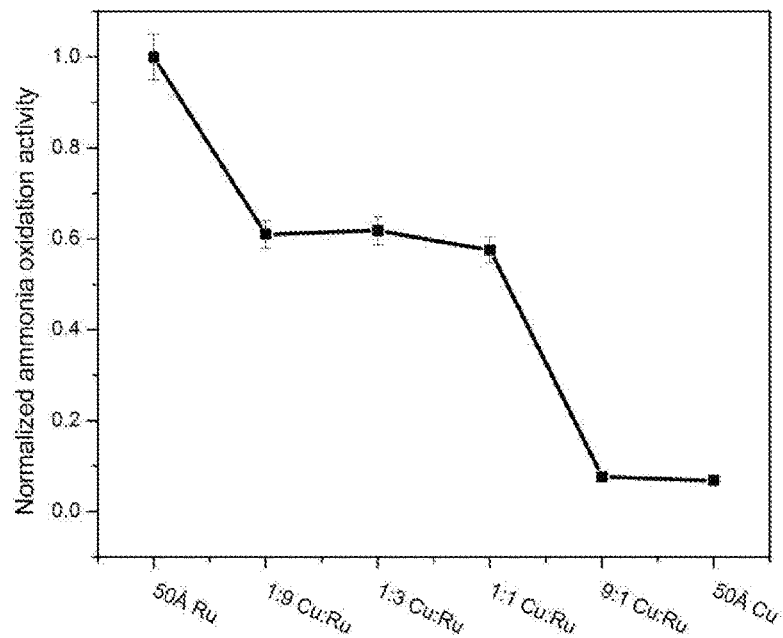
FIG. 2 shows the activity of a co-evaporated thin film produced by co-evaporation of two metals.

Thin films of co-evaporated metals are further investigated and their activity tested in FIG. 2. The co-evaporated films are not as active as the overlayered structures but still perform better than pure Cu but worse than a pure Ru thin film. Adding copper to the bulk does not improve the catalytic performance of the thin film as in the case of copper as overlayer.

The lower activity of the co-evaporated thin films can in the light of the ISS and XPS analysis be explained by not reaching the equilibrium structure during the testing phase. The clear trend in segregation leads to the overlayer structure being the most active and stable configuration of the Cu/Ru system for ammonia oxidation.

In order to test the activity in a real catalyst, the Cu/Ru system is further applied to a high surface area alumina support. The high surface area catalysts are prepared by incipient wetness impregnation. Hydrated $RuCl_3.xH_2O$ is dissolved in millipore water which is poured onto appropriate amounts depending on batch size of alumina powder targeting a Ru loading of in 1 weight percentage on alumina. The catalyst is dried at room temperature at least overnight. The catalyst is then reduced at 500° C. in a ~20 ml/min pure $H_2$ flow for 2 hours. Immediately after the reduction the catalyst is impregnated with varying amounts of copper(II) nitrate corresponding to various fractions of Cu to Ru. The catalyst is dried at room temperature overnight and reduced in-situ immediately before testing.

The high surface area catalysts are tested in a plug flow reactor setup. The catalyst is suspended in a glass tube embedded in quartz wool. The reactor is placed in an oven and the temperature of the catalyst and the oven is measured by a k-type thermocouple individually. The inlet of the reactor is connected to a gas manifold where the reactants are mixing and the composition is set by flow controllers. For experiments the flow is set at 10.75 ml/min of 5000 ppm $NH_3$ in argon, 4 ml/min of 1% $O_2$ in argon and 10 ml/min argon to keep stoichiometric conditions. The outlet of the reactor is measured by a FTIR spectrometer and the pressure is regulated to 1 bar by a pressure controller.

Figure 3:
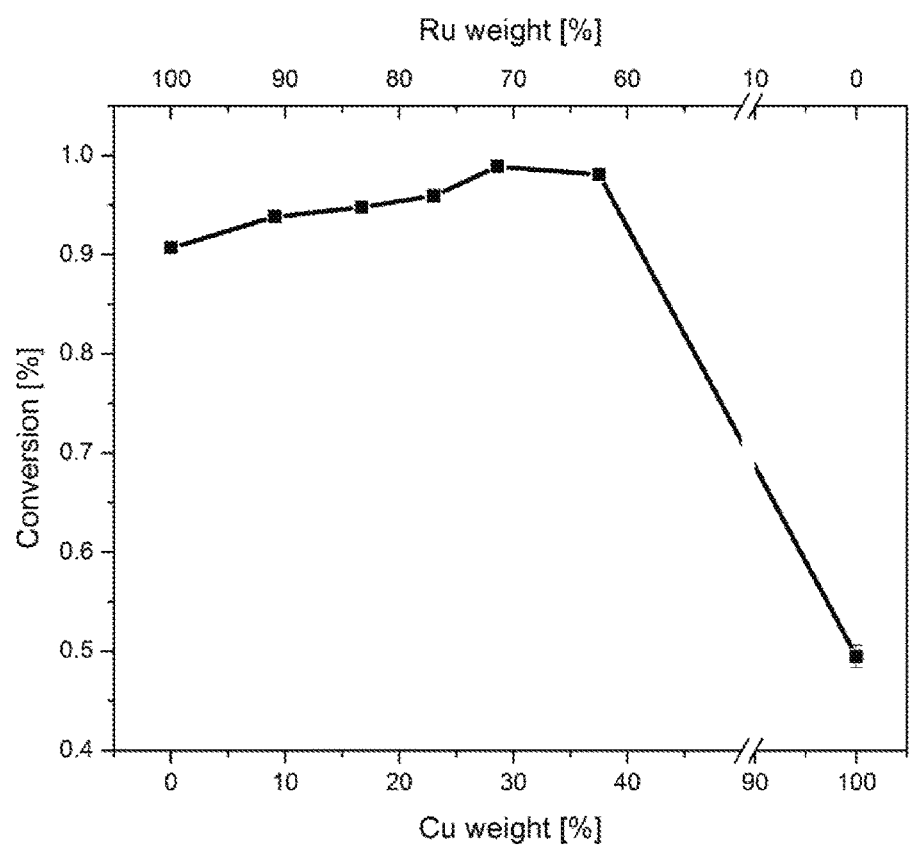
FIG. 3 shows to two metal weight % ratio vs. the normalized catalytic conversion, according to some embodiments of the invention.

FIG. 3 shows the normalized catalytic conversion achieved by adding Cu onto a Ru layer of 50 Å. At 0% Cu, 100% Ru, the catalytic activity corresponds to the one of pure Ru. It can be seen that by increasing the amount of Cu up to 30 weight %, i.e. 70 weight % of Ru, the catalytic conversion is enhanced. At 100% Cu, i.e. 0% Ru, the catalytic conversion of pure Cu is around 0.5%, thus lower than the one of the overlayered structure and lower that the one of the pure Ru layer.

For the high surface area catalysts, a systematic variation of catalyst activity can be observed with the variation of Cu loading of the catalyst. One could see a marked increase in the activity of compared to the activities of both Cu and Ru when Cu is added to Ru. In this case, as shown in FIG. 1 and FIG. 3, there is a maximum when the added Ru to Cu weight ratio is 1:0.3.

The high surface area catalyst is further synthesized by co-impregnation however the Cu/Ru particles exhibited low activity. For the Cu/Ru system to exhibit high activity towards ammonia oxidation, ruthenium and copper need to be impregnated successively.

Figure 4:
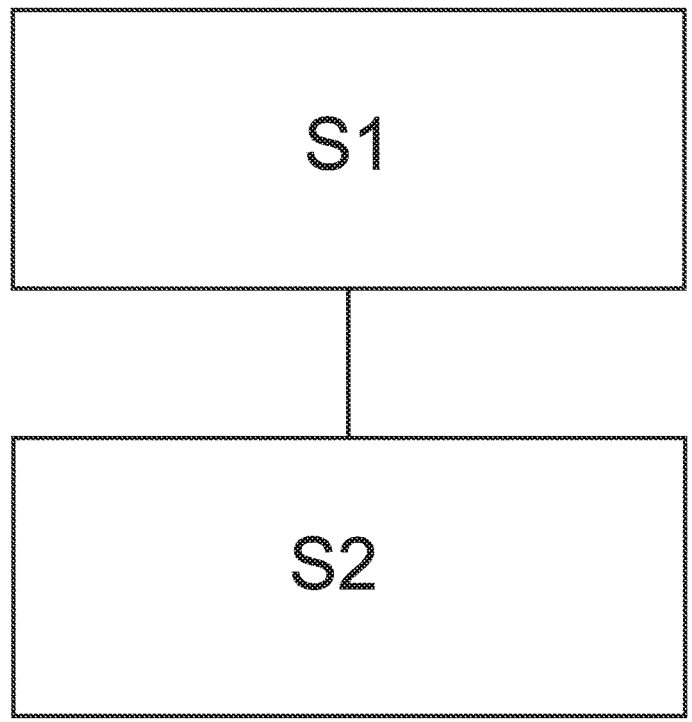
FIG. 4 is a flow-chart of a method according some embodiments to the invention.

FIG. 4 is a flow-chart of a method according some embodiments to the invention.

The method for producing a bimetallic catalyst comprises the steps: S1, depositing the second metal layer, e.g. Ru layer onto the substrate, e.g. alumina;

and subsequently, S2, depositing the first metal layer, e.g. Cu layer onto the second metal layer.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A bimetallic catalyst for ammonia oxidation, said bimetallic catalyst comprising:
   a first metal layer, wherein said first metal layer is a Cu layer;
   a second metal layer, wherein said second metal layer is a Ru layer; and
   a substrate;
   wherein said first metal layer is located onto said second metal layer and
   wherein said second metal layer is located onto said substrate; and
   wherein said first metal layer is a layer of a metal that is less catalytically active towards ammonia oxidation than a metal of said second metal layer; and
   wherein said metal of said first metal layer is segregated onto said second metal layer;
   wherein said metal of said first metal layer does not form an alloy with said metal of said second metal layer, thereby providing a catalyst having a catalytic activity towards ammonia oxidation that is higher than a catalyst having either a single layer of Cu or a single layer of Ru supported on the same substrate; and
   wherein said first metal layer has a thickness between 0.1 and 10 monolayers.

2. The bimetallic catalyst according to claim 1, wherein said first metal layer is a layer of a metal that is less catalytically active towards ammonia oxidation than a metal of said second metal layer.

3. The bimetallic catalyst according to claim 1, wherein the second metal layer is a layer of a metal that is more catalytically active towards ammonia oxidation than a metal of said first metal layer.

4. The bimetallic catalyst according to claim 1, wherein said substrate is a metal oxide.

5. The bimetallic catalyst according to claim 1, wherein said first metal layer has a thickness between 0.1 and 3 monolayers.

6. The bimetallic catalyst according to claim 1, wherein the weight ratio between said second metal layer and said first metal layer is in the area between 1:0.05 and 1:0.5.

7. A method for producing a bimetallic catalyst according to claim 1, said method comprising:
   depositing said second metal layer onto said substrate; and subsequently
   depositing said first metal layer onto said second metal layer.

8. The method according to claim 7, wherein depositing said first metal layer onto said second metal layer comprises depositing a first metal layer having a thickness between 0.1 and 3 monolayers.

9. The method according to claim 7, wherein the weight ratio between said second metal layer and said first metal layer is in the area between 1:0.05 and 1:0.5.

10. A method for tuning the catalytic activity of a bimetallic catalyst according to claim 1, comprising depositing said first metal layer onto said second metal layer, thereby changing the position of the d-band centre of said metal of said first metal layer.

11. The method according to claim 10, wherein said depositing said first metal layer onto said second metal layer comprises depositing said first metal layer having a thickness between 0.1 and 3 monolayers.

12. The method according to claim 10, wherein the weight ratio between said second metal layer and said first metal layer is in the area between 1:0.05 and 1:0.5.

* * * * *